United States Patent

Lanzani et al.

[11] Patent Number: 5,833,894
[45] Date of Patent: Nov. 10, 1998

[54] SHEET OF EXPANDED PLASTICS MATERIAL WITH ABSORBENT PROPERTIES TOWARDS AQUEOUS LIQUIDS

[75] Inventors: Federico Lanzani, Verolanuova—Brescia; Renato Mauri, Manerbio—Brescia, both of Italy

[73] Assignee: Sirap-Gema S.p.A., Verolanuova—Brescia, Italy

[21] Appl. No.: 680,156

[22] Filed: Jul. 15, 1996

[30] Foreign Application Priority Data

Jul. 17, 1995 [IT] Italy ................................. MI95A1541

[51] Int. Cl.[6] .................................................. B29C 67/20
[52] U.S. Cl. ................ 264/46.3; 264/45.9; 264/45.8; 264/45.5; 264/50; 264/51; 264/53; 264/548; 264/550; 264/544; 264/154; 264/155; 264/156; 206/557; 220/405; 229/407; 426/124
[58] Field of Search .................. 264/46.3, 45.9, 264/45.8, 45.5, 50, 51, 53, 548, 550, 544, 154, 156, 155; 206/557; 220/405; 229/407; 426/124

[56] References Cited

U.S. PATENT DOCUMENTS

| | | | |
|---|---|---|---|
| 3,461,496 | 8/1969 | Winstead | 18/12 |
| 3,566,871 | 3/1971 | Richter et al. | 128/296 |
| 3,610,509 | 10/1971 | Winstead | 229/2.5 |
| 3,769,056 | 10/1973 | Sincock | 117/5.5 |
| 4,061,145 | 12/1977 | DesMarais | 128/275 |
| 4,065,884 | 1/1978 | Tenquist | 52/37 |
| 4,533,585 | 8/1985 | Holden | 428/116 |
| 4,791,145 | 12/1988 | Pressman | 521/98 |
| 4,990,541 | 2/1991 | Nielsen et al. | 521/70 |
| 5,254,301 | 10/1993 | Sessions et al. | 264/46.2 |

FOREIGN PATENT DOCUMENTS

| | | |
|---|---|---|
| 090507 | 10/1983 | European Pat. Off. |
| 1596691 | 7/1970 | France. |

*Primary Examiner*—William P. Watkins, III
*Attorney, Agent, or Firm*—Ostrolenk, Faber, Gerb & Soffen, L.L.P.

[57] ABSTRACT

A sheet of expanded plastics material with absorbent properties towards aqueous liquids has a structure with intercommunicating cells and comprises at least one surfactant and at least one lubricating agent. The invention also relates to a tray (1) of plastics material for foods which may release liquids, comprising a base (2) and side walls (3), wherein the base (2) has holes (4) of 0.1–1.5 mm diameter in the surface (4) which is intended to contact the food, and is produced from a sheet as described above. Methods of producing the sheet and the tray are also described.

8 Claims, 2 Drawing Sheets

SHEET OF EXPANDED PLASTICS MATERIAL WITH ABSORBENT PROPERTIES TOWARDS AQUEOUS LIQUIDS

FIELD OF THE INVENTION

The present invention relates in general to a sheet of expanded plastics material.

In particular, the invention relates to a sheet of plastics material with intercommunicating cells which has the power to absorb aqueous liquids.

The invention also relates to a method of producing the sheet with intercommunicating cells and to the use of the sheet in the production of trays for the packaging of food products particularly foods such as, for example, meat or fish, which may release blood fluids or other liquids.

BACKGROUND OF THE INVENTION

In the packaging of foods such as meat or fish, which may release blood fluids, there is the problem of providing packages which can isolate and conceal the blood fluids released by the food since it has been found that its presence and visibility inside the package makes the package unattractive to the purchaser.

Amongst the solutions proposed for this problem in the prior art, the simplest is that of providing a tray with a pad or layer of absorbent material, generally paper. Solutions of this type are described, for example, in patent applications EP-A-0 182 139, GB-A-1 168 925, EP-A-0 544 562, in the patent FR 2 688 474, and in utility model DE 9013898.8.

The absorbent layer may simply be fixed to the internal surface of a tray of plastics material or interposed between two sheets of plastics material, of which that which is in contact with the food has holes through which the liquid released by the food is conveyed towards the interposed absorbent layer.

The trays mentioned above have the disadvantage of being made of materials of different kinds, that is, expanded plastics, generally polystyrene, and paper or similar hydrophilic materials, which are difficult to separate so that there is little or no chance of their being recycled. Moreover, the production cost of these trays is considerably greater than that of conventional non-absorbent trays, because of the presence of the paper.

Trays made of a single material, generally expanded polystyrene, which can isolate the liquid discharged from the food by causing it to descend by gravity into a space formed between two sheets of the plastics material by passing through holes in the sheet on which the food is placed are also known.

Examples of these trays are given in patent applications EP-A-0 574 819 and WO 94/00366.

Trays of the type described above have the disadvantage of having holes which are necessarily quite large to allow the blood fluids to descend by gravity and, for this reason, they allow the blood fluids collected in the space to be seen easily. Moreover, the blood fluids can easily return to the sheet in contact with the food as a result of the inversion or simply the inclination of the tray.

SUMMARY OF THE INVENTION

The problem upon which the present invention is based is that of providing a sheet of plastics material which itself has absorbent properties towards liquids released by foods and which therefore constitutes the sole starting material to be used in the production of trays for foods which may release liquids, thus avoiding the problems described above with reference to the trays of the prior art.

This problem is solved, according to the invention, by a sheet of expanded plastics material which is absorbent towards aqueous liquids, having a structure with intercommunicating cells and comprising at least one surfactant and at least one lubricating agent.

The expanded plastics material of which the sheet according to the invention is made is preferably selected from the group comprising polystyrene, polyvinyl chloride and copolymers thereof.

Expanded polystyrene is particularly preferred.

The surfactant included in the expanded plastics material of which the sheet according to the invention is made preferably constitutes from 0.2 to 10% of the total weight of the material and may be selected from the anionic, cationic and non-ionic surfactants in common use.

The expanded plastics material advantageously includes a quantity of surfactant variable from 1 to 4% by weight of the total weight and the surfactant is preferably a salt of a sulphonic acid of the formula $R-SO_3H$ or a sulphuric ester of the formula $R-OSO_3H$, in which R is selected from the group comprising alkyl and alkylaryl groups, with an alkali metal or an alkaline earth.

A surfactant which has been found particularly useful for the purposes of the present invention is the aliphatic sulphonate marketed by the firm NOVACROME with the name HOSTASTAT SYSTEM E 3904®.

The lubricating agent used in the method according to the invention is advantageously selected from the group comprising mono- and diglycerides of fatty acids and mixtures thereof, salts of fatty acids with alkali-metals, alkaline earths and zinc, mineral oils, amides of fatty acids and esters of fatty acids with aliphatic alcohols, and the quantity used is preferably variable from 0.5 to 5.0% by weight of the plastics material.

A lubricating agent which has been found particularly useful for the purposes of the present invention is the mixture of mono- and diglycerides of fatty acids marketed by the firm SOGIS with the name of GMS40®.

The sheet of the present invention can be produced by a method which comprises the following steps:

forming a mixture of a synthetic resin with a surfactant and incorporating a lubricating agent therein, mixing the mixture and melting it by heating in an extruder, incorporating a blowing agent therein, extruding the mixture in an ambient with a lower pressure to produce an expanded sheet, subjecting the expanded sheet to mechanical compression, during which its thickness is reduced to a value of between 10% and 60% of the initial thickness.

The blowing agent is generally incorporated in the mixture in the form of gas under pressure.

According to a preferred embodiment of the method of the invention, the mechanical compression is brought about by passage between a pair of cylindrical rollers with parallel axes rotating at a distance from one another such as to achieve the above-mentioned reduction in thickness.

The sheet of expanded plastics material of the present invention can be used as an absorbent layer instead of the paper layers or pads used in the trays of the prior art described in the above-mentioned documents EP-A-0 182 139, FR-A-2 688 474, GB-A-1 168 925, EP-A-0 544 562 and in the utility model DE 9013898.8, eliminating any problem connected with the difficulty of recycling the materials, and achieving a considerable reduction in costs.

The use of the sheet according to the invention as an absorbent sheet in the production of a tray according to the patent FR 2 688 474 has been found particularly advantageous.

To facilitate the absorption of liquids, the absorbent layer formed by the sheet according to the invention may advantageously have holes of 0.1–1.5 mm diameter on the side which is intended to contact the food.

These holes may be formed, for example, by perforation of the expanded sheet by a machine with needle rollers.

Alternatively, the absorbent layer may be passed between a pair of cylindrical rollers with parallel axes of which one has an embossed surface. As a result of this passage, one of the surfaces of the substrate takes on an embossed appearance and is rough in the embossed region. This particularly facilitates the absorption of the aqueous liquids.

The present invention also relates to a tray of expanded plastics material, produced entirely with the sheet described above, for foods which may release liquids.

A tray of this type comprises side walls and a base which has holes of 0.1–1.5 mm diameter on the surface which is intended to contact the foods.

The food contacting surface of the base of the tray generally has 10 to 100 holes per $dm^2$ and the holes are preferably disposed in the peripheral regions of the base of the tray.

Slits of about 0.1–1.5 mm width may be provided instead of holes.

As an alternative to holes or slits, the base of the tray may have embossing in the region of which the sheet is rough and easily permeable to aqueous liquids.

BRIEF DESCRIPTION OF THE DRAWINGS

The advantages of the sheet and of the tray according to the invention are clear from the detailed description of some embodiments given below by way of non-limiting example with reference to the appended drawings, in which.

DETAILED DESCRIPTION OF THE INVENTION

Figure 1:
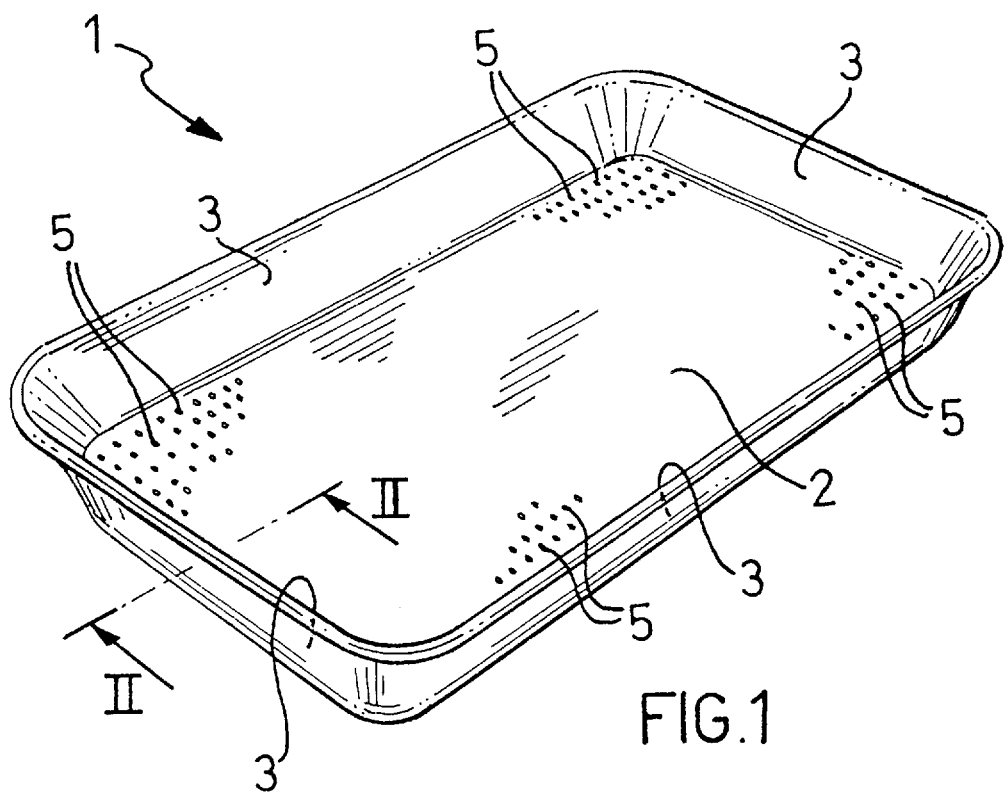
FIG. 1 is a perspective view of a tray according to the invention.

With reference to FIG. 1, a tray according to the invention comprises a body 1 having a base 2 with holes 5 and side walls 3.

Figure 2:
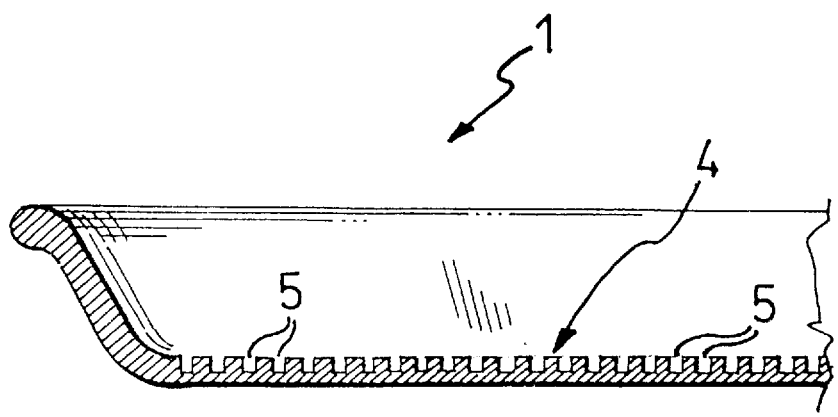
FIG. 2 is a partial cross-section of a tray according to the invention.

With reference to FIG. 2, a tray according to the invention has a series of holes 5 of 0.1–1.5 mm diameter in the surface 4 of the base 2, the holes penetrating up to a maximum depth of 9/10 of the thickness of the sheet of plastics material constituting the base 2.

When a tray according to the invention of the type described is used to package foods which may release aqueous liquids, for example, such as meat, the liquid released by the food finds the holes 5 in the surface 4 of the base 2 of the tray and seeps through these holes, in spite of their small diameter, by virtue of the presence of the surfactant within the expanded plastics material of which the tray is made.

The surfactant in fact considerably reduces the natural water-repellency of the plastics material, increasing the forces of adhesion between the solid (the plastics material) and the liquid, until they overcome the forces of cohesion between the molecules of the liquid and enable the liquid to wet the surface 4 of the base 2 and seep through the holes 5 into the intercommunicating cell structure of the expanded plastics material of the tray.

To facilitate the entry of the liquid into the holes 5, concavities centred around the holes 4 may be formed on the surface 4 of the base 2.

The intercommunicating cell structure of the expanded plastics material of which the tray is made has a dense network of capillary passages which put the individual cells into communication and enable them to receive and hold the liquid which has seeped through the holes in the upper surface of the base 2 of the tray.

The liquid is thus retained as by a sponge and, because of the strong capillary interactions between the passages and the liquid, the liquid cannot return to the upper surface of the base 2 of the tray by passing through the holes 5, even when the tray is inclined or even inverted.

Neither can the liquid escape from the lower surface 6 of the base of the tray, since this surface is covered by the thin, smooth film which is produced as a result of normal extrusion processes and is impermeable to liquids.

A similar film is also present on the upper surface 4 of the base of the tray, but the holes 5 allow the liquid to pass through it.

Figure 3:
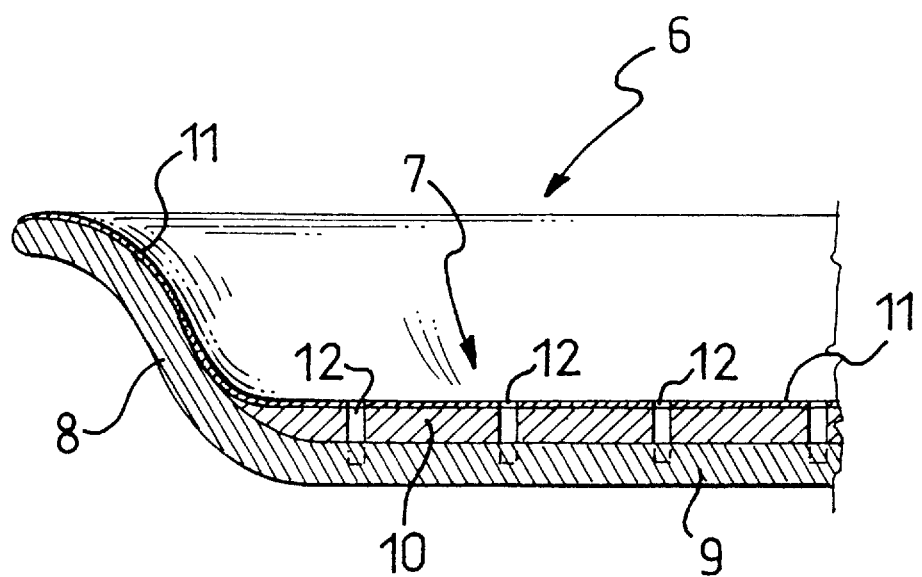
FIG. 3 is a partial cross-section of a tray including an absorbent substrate formed by the sheet according to the invention.

FIG. 3 shows, in partial cross-section, a tray 6 having a base 7 and side walls 8, made from a conventional sheet 9 of expanded plastics material on which an absorbent layer 10 of the sheet according to the invention is superimposed solely on the base 7 of the tray; a third layer 11, constituted by a film of thermoplastic material having holes 12 of 0.1–1.5 mm diameter is applied to the absorbent layer 10 on the base 7 and to the sheet 9 on the side walls 8 of the tray 6. The holes 12 also penetrate the absorbent layer 10 up to a maximum depth of 9/10 of the total thickness of the three layers (11, 10, 9) present in the base of the tray.

The present invention also relates to a method of producing a tray for the packaging of foods which can release liquids.

This method comprises the steps of:

forming a mixture of a synthetic resin with a surfactant and incorporating a lubricating agent therein, mixing the mixture and melting it by heating in an extruder, incorporating a blowing agent therein, extruding the mixture in an ambient with a lower pressure to produce an expanded sheet, forming holes of 0.1–1.5 mm diameter in one of the surfaces of the expanded sheet, subjecting the expanded sheet to mechanical compression, during which its thickness is reduced to a value of between 10% and 60%, of the initial thickness, forming trays from the sheet by thermo-forming.

Alternatively, the last two steps of the method described above may be replaced by the following steps:

forming trays from the expanded sheet by thermo-forming, subjecting solely the bases of the trays to mechanical compression, during which the thickness of the sheet in the base is reduced to a value of between 10% and 60% of the initial thickness.

The blowing agent is generally incorporated in the mixture in the form of gas under pressure.

A tray produced according to the alternative method described above may be advantageous for use when it is desirable for the liquid released by the food to be absorbed solely by the base region and not to spread to the walls of the tray.

The holes in the upper surface of the base of the tray according to the invention may be formed, for example, by perforation of the expanded sheet by a machine with a needle roller, before it is sent for thermo-forming.

Blowing agents which may be used for the purposes of the method of the present invention are those of the group comprising lower aliphatic hydrocarbons, HFC, $CO_2$ and mixtures thereof.

The method according to the invention will be described further by means of the following examples, given by way of non-limiting example.

EXAMPLE 1

94.5 kg of HÜLS 136 polystyrene was mixed with 0.5 kg of HYDROCEROL CLM 70®, 2.5 kg of HOSTASTAT SYSTEM E 3904® and 2.5 kg of GMS 40® and fed into an extruder with two screws having a cylinder diameter of 122 mm and a length/diameter ratio (L/D) of 20, with a flow rate of 135 kg/h.

5 kg of n-butane at a pressure of 45 bars was added as a blowing agent to the mixture of the above-mentioned components which had already been melted and amalgamated in the first section of the extruder and the mixture was extruded (head pressure 45 bars) through a circular die having an aperture of 0.6 mm.

The temperature profile in the various regions of the extruder, from the supply region towards the extrusion head was as follows:

| | |
|---|---|
| T1 | 237° C. |
| T2 | 264° C. |
| T3 | 234° C. |
| T4 | 71° C. |
| T5 | 79° C. |
| T6 | 135° C. |
| T7 | 131° C. |
| T8 | 139° C. |
| T9 | 139° C. |
| T10 | 129° C. |
| T11 | 106° C. |

The cylindrical, tubular body of expanded plastics material output from the extruder was then subjected to the usual cutting steps to produce a sheet 5 mm thick, and was cooled.

Holes of 1 mm diameter and 3 mm deep were formed in the sheet thus produced, by means of a machine with a needle roller.

After seasoning for a few days at ambient temperature, the sheet was passed between a pair of cylindrical rollers with parallel axes rotating in opposite senses 2 mm apart and, finally, was sent for thermo-forming to produce trays according to the invention.

EXAMPLE 2

Upon completion of the seasoning at ambient temperature, the sheet produced according to Example 1 was passed between the pair of rollers and sent to a cutting stage for forming quadrangular portions thereof for use as absorbent layers in the composite food tray structure shown in FIG. 3, according to the method described in the patent FR-A-2 688 474.

EXAMPLE 3

95.0 kg of Vestyron polystyrene 314 from the firm HÜLS were mixed with 0.4 kg of a mixture of nucleating agents constituted by talc, citric acid and sodium bicarbonate with a weight ratio of 1:1:1, 4.0 kg of HOSTASTAT SYSTEM E 3904® and 0.6 kg of ethylenedistearyl amide and fed into an extruder with two screws having a cylinder diameter of 122 mm and a length/diameter ratio (L/D) of 20, with flow-rate of 120 kg/h.

5 kg of n-butane at a pressure of 45 bars was added, as a blowing agent, to the mixture of the above-mentioned components which had already been melted and amalgamated in the first section of the extruder and the mixture was extruded (head pressure 45 bars) through a circular die with an aperture of 0.6 mm.

The temperature profile in the various regions of the extruder from the supply region towards the extrusion head was the same as that given in Example 1.

The tubular cylindrical body of expanded plastics material output from the extruder was then subjected to the usual cutting steps to produce a sheet 5 mm thick, and cooled.

Holes of 0.8 mm diameter and 3 mm deep were formed in the sheet thus produced, by means of a machine with a needle roller.

After curing for a few days at ambient temperature, the sheet was passed between a pair of cylindrical rollers with parallel axes rotating in opposite senses 2 mm apart and, finally, was sent for thermo-forming to produce trays according to the invention.

The tray produced with the sheet according to the present invention has a series of advantages in comparison with trays of the prior art.

First of all, in comparison with a tray including a pad or layer of absorbent paper-type material, it offers the advantage of being made solely of plastics material and thus permitting easy recycling. Moreover, the production costs of the tray of the invention are considerably lower than those connected with the manufacture of the trays mentioned above.

The use of the tray according to the invention achieves the great advantage, in comparison with trays made of a single material of the prior art, of preventing the return of the liquid released by the food onto the surface on which the food is placed, by virtue of the strong retention effect exerted on the liquid by the particular porous-capillary structure of the expanded plastics material of which the tray is made, and by virtue of the small dimensions of the holes.

We claim:

1. A method of producing a sheet of expanded plastics material which has a structure with intercommunicating cells and displays absorptive power towards aqueous liquids, which method comprises the following steps:

forming a mixture of a synthetic resin with at least one surfactant and at least one lubricating agent therein, mixing the mixture and melting it by heating in an extruder, incorporating a blowing agent therein, extruding the mixture in an ambient with a lower pressure to produce an expanded sheet, subjecting the expanded sheet to mechanical compression, during which its thickness is reduced to a value of between 10% and 60% of the initial thickness.

2. A method according to claim 1, wherein said blowing agent is incorporated in the mixture in the form of a gas under pressure.

3. A method according to claim 2, wherein said at least one lubricating agent is selected from the group consisting of mono-glycerides of fatty acids, di-glycerides of fatty acids, and mixtures thereof, salts of fatty acids with alkali metals, alkaline earth, zinc, esters of fatty acids with aliphatic alcohols, amides of fatty acids, and mineral oils.

4. A method according to claim 3, wherein said synthetic resin is selected from the group consisting of polystyrene, polyvinyl chloride and copolymers thereof.

5. A method according to claim 4, wherein the mechanical compression is brought about by passage between a pair of cylindrical rollers with parallel axes rotating at a distance from one another such as to achieve said reduction in thickness.

6. A method of producing a tray for foods which may release liquids, comprising a base and side walls, wherein the base has holes of 0.1–1.5 mm diameter in the surface which is intended to contact the foods, and is produced from a sheet of expanded plastics material which has absorptive power towards aqueous liquids, with a structure having intercommunicating cells, and comprising at least one surfactant and at least one lubricting agent, said method comprising the steps of:

forming a mixture of a synthetic resin with a surfactant and a lubricating agent therein, mixing the mixture and melting it by heating in an extruder, incorporating a blowing agent therein, extruding the mixture in an ambient with a lower pressure to produce an expanded sheet, forming holes of 0.1–1.5 mm diameter in one of the surfaces of the expanded sheet, subjecting the expanded sheet to mechanical compression, during which its thickness is reduced to a value of between 10% and 60% of the initial thickness, forming trays from the sheet by thermo-forming.

7. A method according to claim 6, wherein the mechanical compression is brought about by passage between a pair of cylindrical rollers with parallel axes rotating at a distance from one another such as to bring about said reduction in thickness.

8. A method of producing a tray for foods which may release liquids, comprising a base and side walls, wherein the base has holes of 0.1–1.5 mm diameter in the surface which is intended to contact the foods, and is produced from a sheet of expanded plastics material which has absorptive power towards aqueous liquids, with a structure having intercommunicating cells, and comprising at least one surfactant and at least one lubricting agent, said method comprising the steps of:

forming a mixture of a synthetic resin with a surfactant and a lubricating agent therein, mixing the mixture and melting it by heating in an extruder, incorporating a blowing agent therein, extruding the mixture in an ambient with a lower pressure to produce an expanded sheet, forming holes of 0.1–1.5 mm diameter in one of the surfaces of the expanded sheet, forming trays from the expanded sheet by thermo-forming, subjecting solely the base of the trays to mechanical compression, during which the thickness of the sheet in the base region is reduced to a value of between 10% and 60% of the initial thickness.

* * * * *